Oct. 25, 1932.  Z. C. BRADFORD  1,883,872
CLUTCH
Filed Dec. 16, 1929  2 Sheets-Sheet 1

Inventor
ZERBE C. BRADFORD

Oct. 25, 1932.  Z. C. BRADFORD  1,883,872

CLUTCH

Filed Dec. 16, 1929   2 Sheets-Sheet 2

Inventor
ZERBE C. BRADFORD
By Spencer, Hardman and Fehr
His Attorneys

Patented Oct. 25, 1932

1,883,872

UNITED STATES PATENT OFFICE

ZERBE C. BRADFORD, OF DAYTON, OHIO, ASSIGNOR TO DELCO PRODUCTS CORPORATION, OF DAYTON, OHIO, A CORPORATION OF DELAWARE

CLUTCH

Application filed December 16, 1929. Serial No. 414,388.

This invention relates to improvements in centrifugal clutches adapted to connect a driving member with the member to be driven after the driving member has attained a proper speed.

One of the objects of the present invention is to provide an improved centrifugal clutch of simple and durable construction, reliable in operation, and which may be produced at a relatively low cost.

Further objects and advantages of the present invention will be apparent from the following description, reference being had to the acompanying drawings wherein a preferred embodiment of one form of the present invention is clearly shown.

Figure 1:
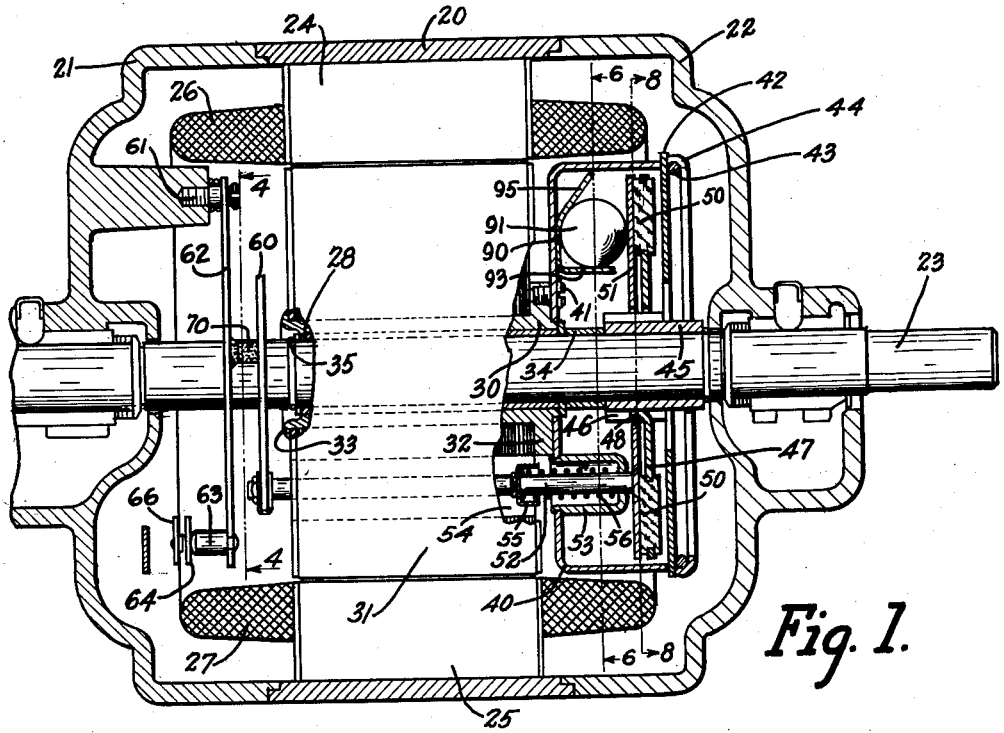
Fig. 1 is a longitudinal sectional view of an electric motor embodying the present invention.

Referring to the drawings, the electric motor comprises a frame member 20 provided with end covers 21 and 22 attached thereto in any suitable manner. End cover members 21 and 22 provide suitable bearings for the motor shaft 23. Frame 20 has stator laminations 24 and 25 which carry stator or field windings 26 and 27 respectively.

Upon the shaft 23 there is provided a bearing sleeve 28. Upon this sleeve is supported a tubular member 30 which in turn supports the rotor or armature 31. In Fig. 1 it will be seen that the sleeve 30 has an annular flange 32 at its one end, the other end of the sleeve being spun over the armature 31 as at 33 whereby said armature is secured upon said sleeve 30. The bearings 28 and 29 are maintained in proper position upon the shaft by a collar 34 and a spring clip 35. Bearings 28 and 29 rotatably support the armature supporting sleeve 30 upon the shaft 23.

A cup-shaped housing 40 is secured to the flange 32 of the sleeve 30 by screws 41 so that said housing will at all times rotate with the armature 31. An end cover 42 is provided for the housing 40 and is maintained upon said housing by the clamping ring 43 fitting into spaced ears 44 provided in the edge of the housing 40.

Figure 2:
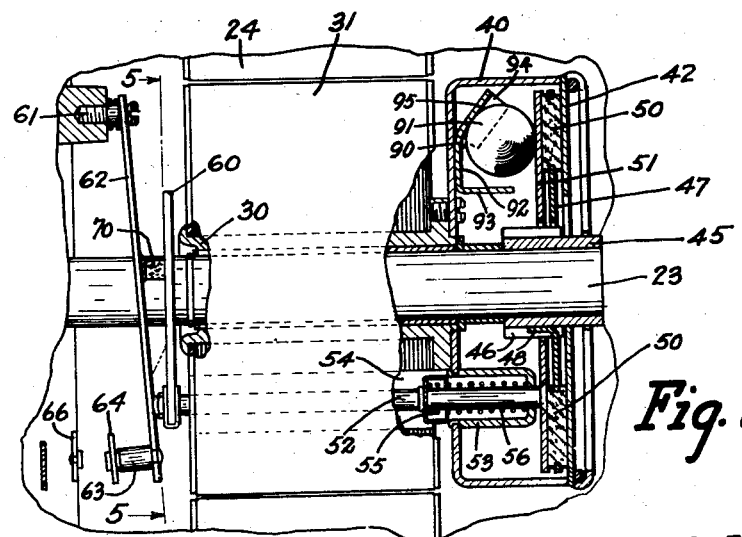
Fig. 2 is a fragmentary sectional view showing the clutch in driving position.
Figure 3:
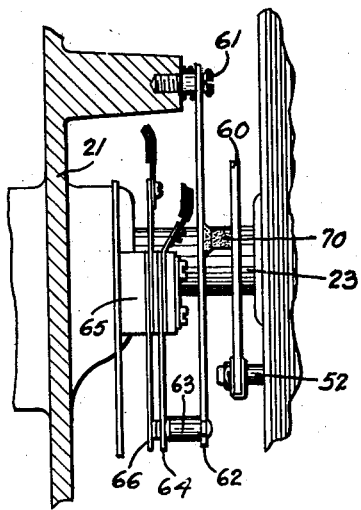
Fig. 3 is a fragmentary view illustrating the switching mechanism for the electric motor.
Figure 4:
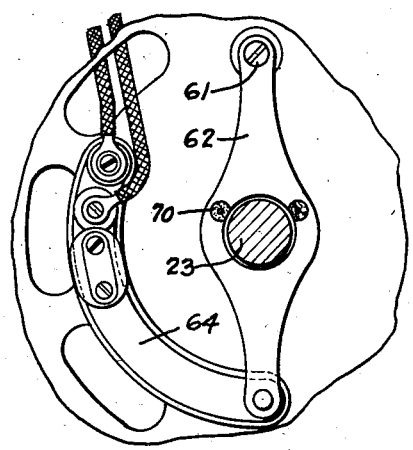
Fig. 4 is a fragmentary view taken along the line 4—4 of Fig. 1.
Figure 5:
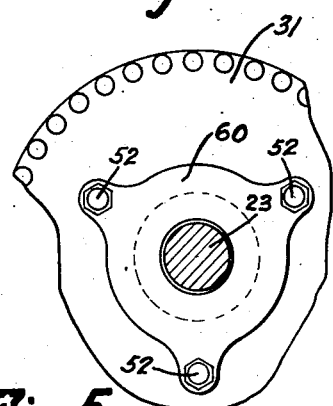
Fig. 5 is a fragmentary view taken along the line 5—5 of Fig. 2.

Upon the shaft 23 there is keyed a sleeve 45 having longitudinal channels 46 provided in its outer surface. A disc 47 is supported upon the channeled sleeve 45, the central aperture of said disc having angular portions 48 which ride within the channels 46 of the sleeve 45 so that said disc 47 is slidable longitudinally of the sleeve 45, but must rotate therewith. Disc 47 carries a plurality of frictional members 50, made up of any suitable material such as cork, brake lining material or the like, said members 50 being arranged in a circular row and in spaced relation. A continuous piece of friction material may be secured to the sides of plate 47 instead of the discs 50 as shown. A plate 51 fits loosely about the channeled sleeve 45, said plate having a pin 52 secured thereto which extends through a collar 53 supported in the housing 40, through an opening 54 in the armature and extends from the opposite side of the armature as shown in the Figs. 1 and 3. A collar 55 is secured to the stem 52 and a spring 56 is interposed between said collar 55 and the end of the collar 53 carried by the housing 40, this spring urging the stem 52 and consequently the plate 51 toward the left as regards Figs. 1 and 2, or more specifically urging said plate 51 toward the armature 31. The end of the stem 52 extending from the left end of the armature as regards Fig. 1, is attached to a three-legged plate 60, there being three of the structures including stem 52 extending from the plate 51 through the armature 31. Plate 60 has an opening through which the armature shaft 23 loosely extends.

The frame 21 has a screw 61 which hingedly supports one end of the contact operating arm 62, the free end of the arm carrying an insulating button 63 engaging the spring contact blade 64. Spring contact blade 64 is insulatingly supported by the lug 65 provided by the end cover member 21, another contact blade 66 also being insulatingly supported by said member. The spring blade 64 is normally adapted to move out of engagement with the contact blade 66; however, when the plate 60 engages the blocks 70 carried by the contact operating arm 62, said plate 60 under the influence of springs 56 will move the arm 62 to engage contact blade 64 so as to maintain said blade in contact engagement with the blade 66.

From the aforegoing it may be seen that normally, that is, when the electric motor is not operating, contact blades 64 and 66 are engaged.

Figure 6:
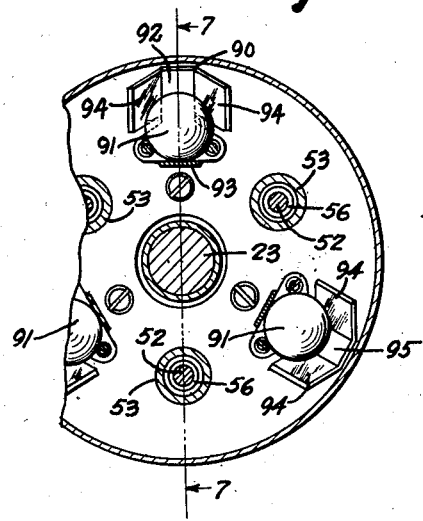
Fig. 6 is a fragmentary part-sectional view taken along the line 6—6 of Fig. 1.
Figure 7:
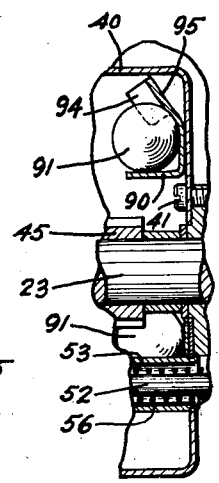
Fig. 7 is a fragmentary sectional view taken along the line 7—7 of Fig. 6.
Figure 8:
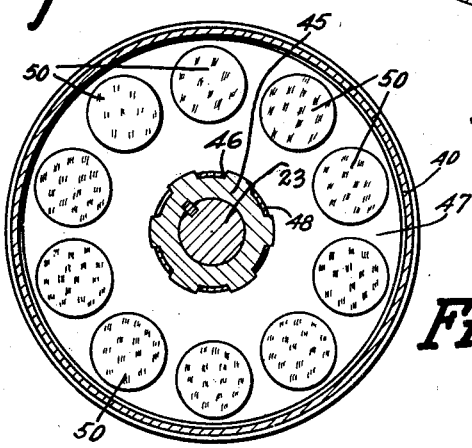
Fig. 8 is a detail view taken along the line 8—8 of Fig. 1.

A centrifugal device is adapted to control the operation of the clutch and the aforegoing described switching mechanism in response to varying speeds of the electric motor. The centrifugal mechanism comprises pocket members 90 attached to the housing 40 in any suitable manner. These pocket members act as containers for the balls 91 which form the centrifugal means for operating the clutch. The pockets as shown particularly in Figs. 1, 6 and 7 are made up of sheet metal and comprise walls 92 and 93 provided with side members 94, the walls and side members all being arranged relatively angularly and thus forming tapering or wedge-shaped pockets. The walls all converge toward the end wall of the housing 40, or, diverge as they approach the plate 51. The sloping wall 96 of the ball pocket member tends to urge the ball 91 toward the plate 51 as the balls are thrown outwardly due to centrifugal force, and thus said balls when so moved will engage the plate 51 and by moving it toward the end cover member 42 of the housing, the disc carrying plate 47 will be moved likewise so that the frictional discs 50 thereof will engage said end cover member 42 and thus the housing 40, its end cover member 42, the disc carrying plate 47, and armature 31 will be operatively connected with the shaft 23 for, as has been described, housing 40 is attached to the armature supporting sleeve 30, while plate 47 is operatively connected with the sleeve 45 keyed to the shaft 23.

The movement of the disc supporting plate 47 and the plate 51 toward the end cover member 42 of the housing 40 causes stems or rods 52 to be moved toward the right and thus after the motor has attained a proper speed, the contact plate 64 will be permitted to move out of engagement with the cooperating contact plate 66 to break the starting circuit, which, as has been described, is completed through engagement of contacts 64 and 66.

From the aforegoing it may be seen that during the starting operation, at which time contacts 64 and 66 are closed and balls 91 fit snugly within their respective ball retainers 90, no rattling of the balls obtains for each pocket, having tapering walls, will self-center the respective balls, causing them to be held securely in position to avoid rattling during the starting operation. During running, these balls are flung outwardly due to centrifugal force, engaging the members 95 of the respective ball retainers 90 and the plate 51 with a wedging effect to maintain the plate 51 in a position in which the discs 50 are pressed into gripping engagement with the end cover member 42 of the housing 40.

While the form of embodiment of the present invention as herein disclosed, constitutes a preferred form, it is to be understood that other forms might be adopted, all coming within the scope of the claims which follow.

What is claimed is as follows:

1. A device of the character described, comprising in combination, a driving member; a driven member; a housing attached to the driving member; shiftable means within said housing operatively connectible with the driven member; centrifugal means adapted to move the shiftable means into gripping engagement with said housing; and a wedge-shaped cage rigidly secured to a wall of the housing which is substantially at right angles to the axis of the driving member, said cage cooperating with the shiftable means to provide a pocket for supporting the centrifugal means.

2. A device of the character described, comprising in combination, a driving member; a driven member; a housing attached to the driving member; shiftable means within said housing operatively connectible with the driven member; centrifugal means adapted to move the shiftable means into gripping engagement directly with said housing; and a cage rigidly secured to the housing, said cage having angularly arranged walls cooperating with the shiftable means to provide a wedge-shaped pocket in which the centrifugal means is supported.

3. A device of the character described, comprising in combination, a driving member; a driven member upon which the driving member is rotatably supported; a cup-shaped housing attached to the driving member; an end cover for said housing; a friction member within said housing, supported upon the driven member so as to be movable longitudinally relative thereto but rotatable therewith; a ball movable by centrifugal force, radially relative to the driven member and adapted to engage the friction member to move it into engagement with the housing end cover operatively to connect the driving and driven members; and a sheet metal ball container attached to the housing said container having all of its walls arranged relatively angularly providing a pocket the sides of which diverge as they approach the friction member.

4. A device of the character described, comprising in combination, a driving member; a driven member; a housing attached to the driving member; shiftable means within said housing operatively connectible with the driven member; centrifugal means adapted to move the shiftable means into gripping engagement with said housing; and a sheet metal cage attached to the housing, said cage having one of its sides angularly arranged relative to the housing and shiftable means and cooperating with the latter to provide a tapering pocket in which the centrifugal means is supported, said angularly arranged side of the cage urging the centrifugal means toward the driven member in response to rotation of the housing.

In testimony whereof I hereto affix my signature.

ZERBE C. BRADFORD.